United States Patent [19]

Martin

[11] 4,079,985
[45] Mar. 21, 1978

[54] CAB FOR INDUSTRIAL TRUCK
[76] Inventor: Robert P. Martin, 7809 W. 130th St., Parma, Ohio 44130
[21] Appl. No.: 554,618
[22] Filed: Mar. 3, 1975
[51] Int. Cl.² ............................................. B62D 33/06
[52] U.S. Cl. ................................ 296/28 C; 296/137 R; 98/2.14; 98/2.15; 214/DIG. 7
[58] Field of Search ............ 296/28 C, 137 R, 137 B, 296/102, 146; 214/DIG. 7; 98/2.14, 2.15

[56] References Cited
U.S. PATENT DOCUMENTS

| 2,372,164 | 3/1945 | Woodhams | 98/2.14 |
| 2,806,618 | 9/1957 | Cook | 214/DIG. 7 |
| 2,911,232 | 11/1959 | Hastings, Jr. et al. | 296/102 X |
| 2,926,040 | 2/1960 | Kramer et al. | 296/146 |
| 3,206,245 | 9/1965 | Westrum et al. | 296/102 |
| 3,397,008 | 8/1968 | Timmerman | 296/28 C |
| 3,455,599 | 7/1969 | Becker | 296/102 |
| 3,520,571 | 7/1970 | Rogers | 296/102 |
| 3,610,677 | 10/1971 | Hawley et al. | 296/102 |
| 3,866,942 | 2/1975 | Dobeus et al. | 296/102 |
| 3,954,150 | 5/1976 | Cole et al. | 296/102 |

FOREIGN PATENT DOCUMENTS 1,196,742   7/1970   United Kingdom ............. 296/28 C Primary Examiner—Robert J. Spar
Assistant Examiner—Donald W. Underwood
Attorney, Agent, or Firm—McNenny, Pearne, Gordon, Gail, Dickinson & Schiller

[57] ABSTRACT

A quick-mounting combined overhead guard and weatherproof cab for the body of an industrial lift truck comprises a tubular frame with four roof members and four upright corner members. The roof is closed with steel plating. The front and rear upright corner members at each side form jamb members for cab doors which close against the exterior sides of the frame members. The front and rear faces of the cab and the door bottoms are provided with sealing means cooperative with the truck body. A roof window is provided with an array of cut-out window lights in the steel plating, the spaces between the lights comprising bars that remain integral with the plating. The window is transparently covered by openable cover means.

3 Claims, 14 Drawing Figures

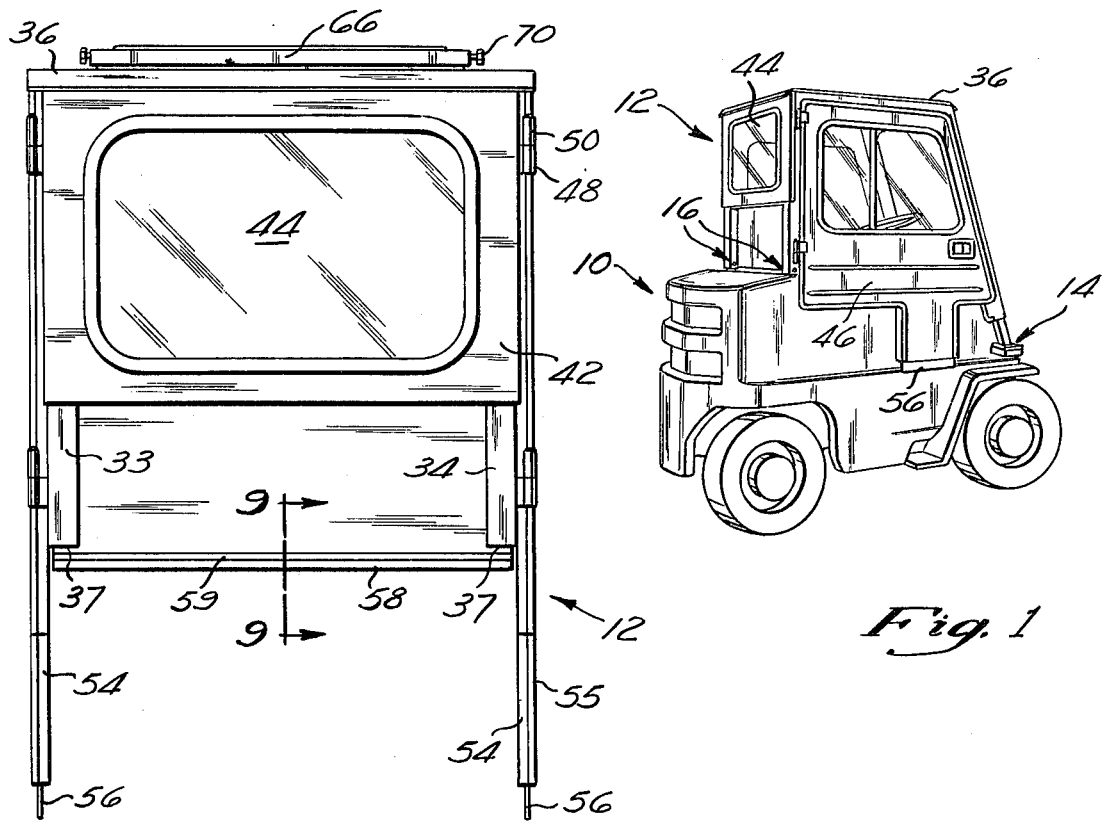
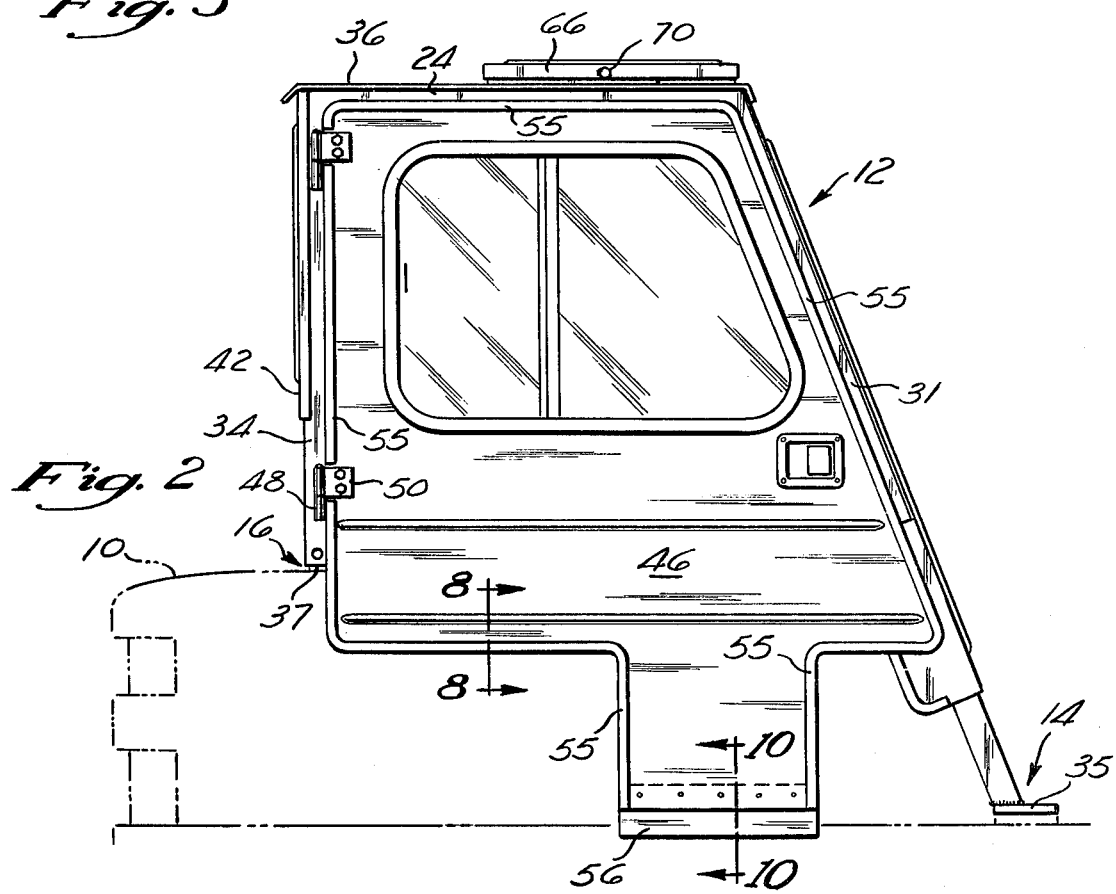

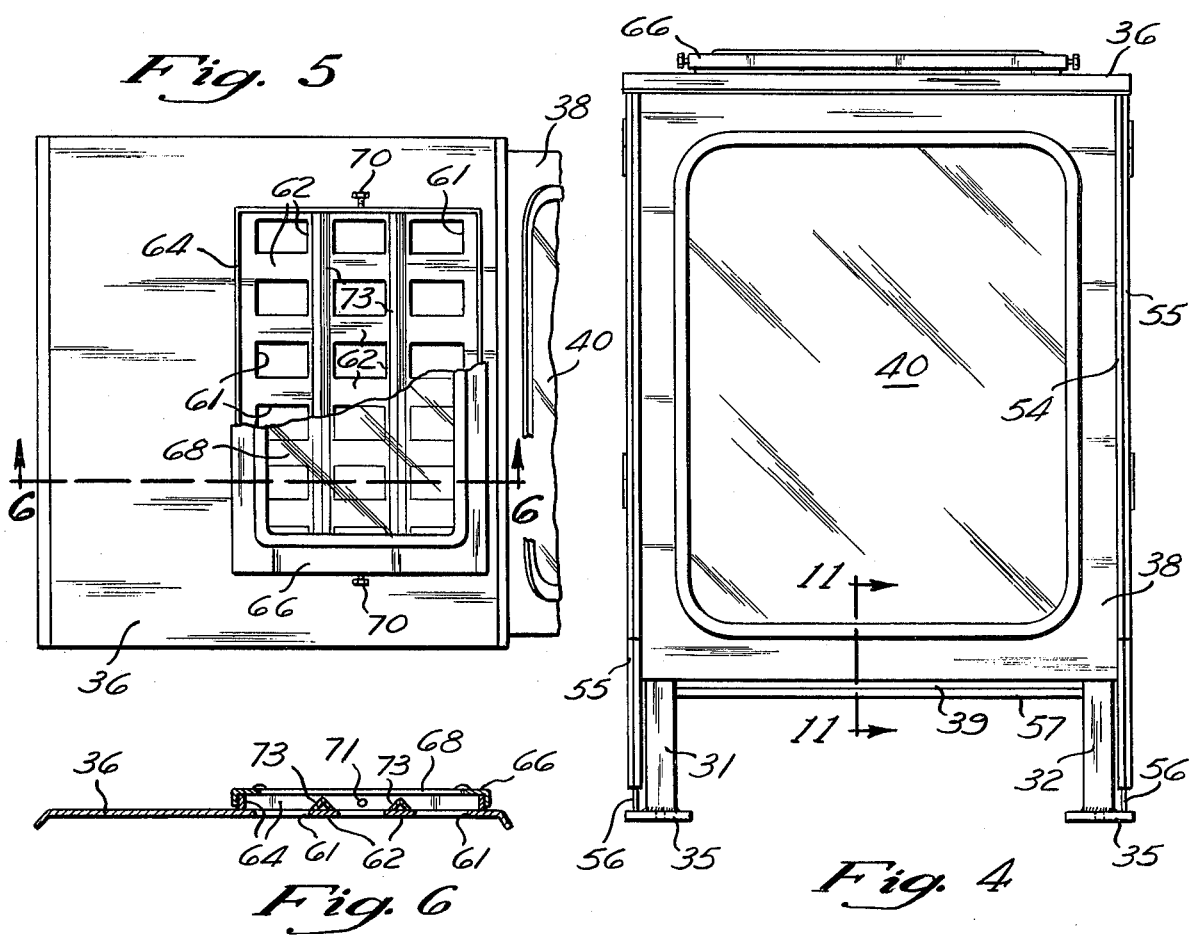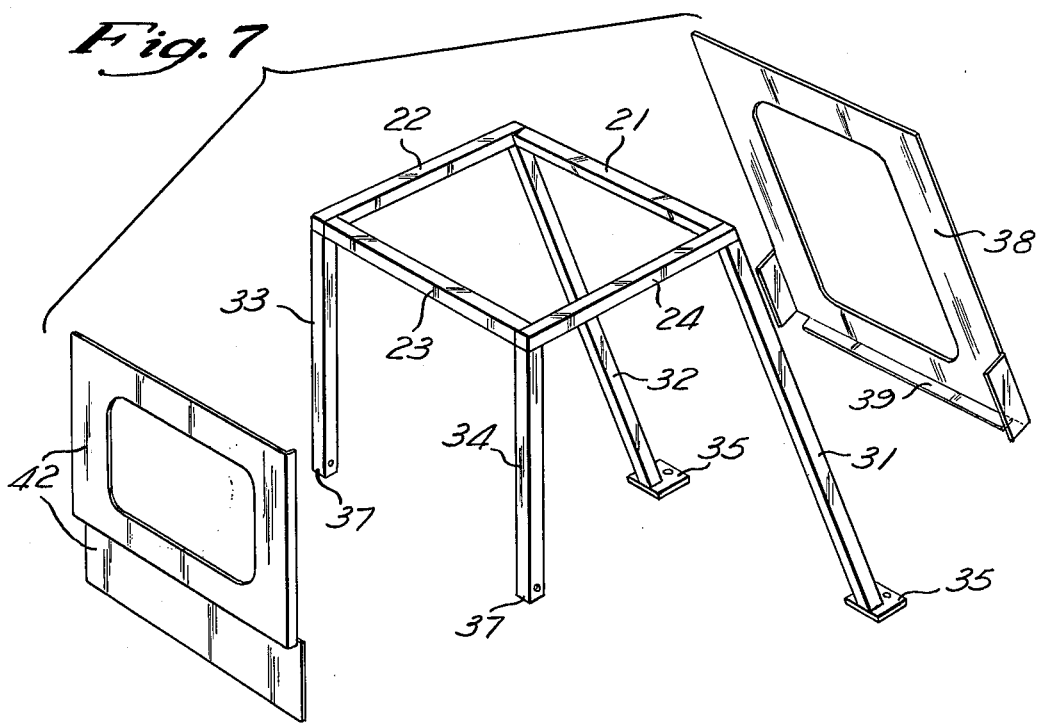

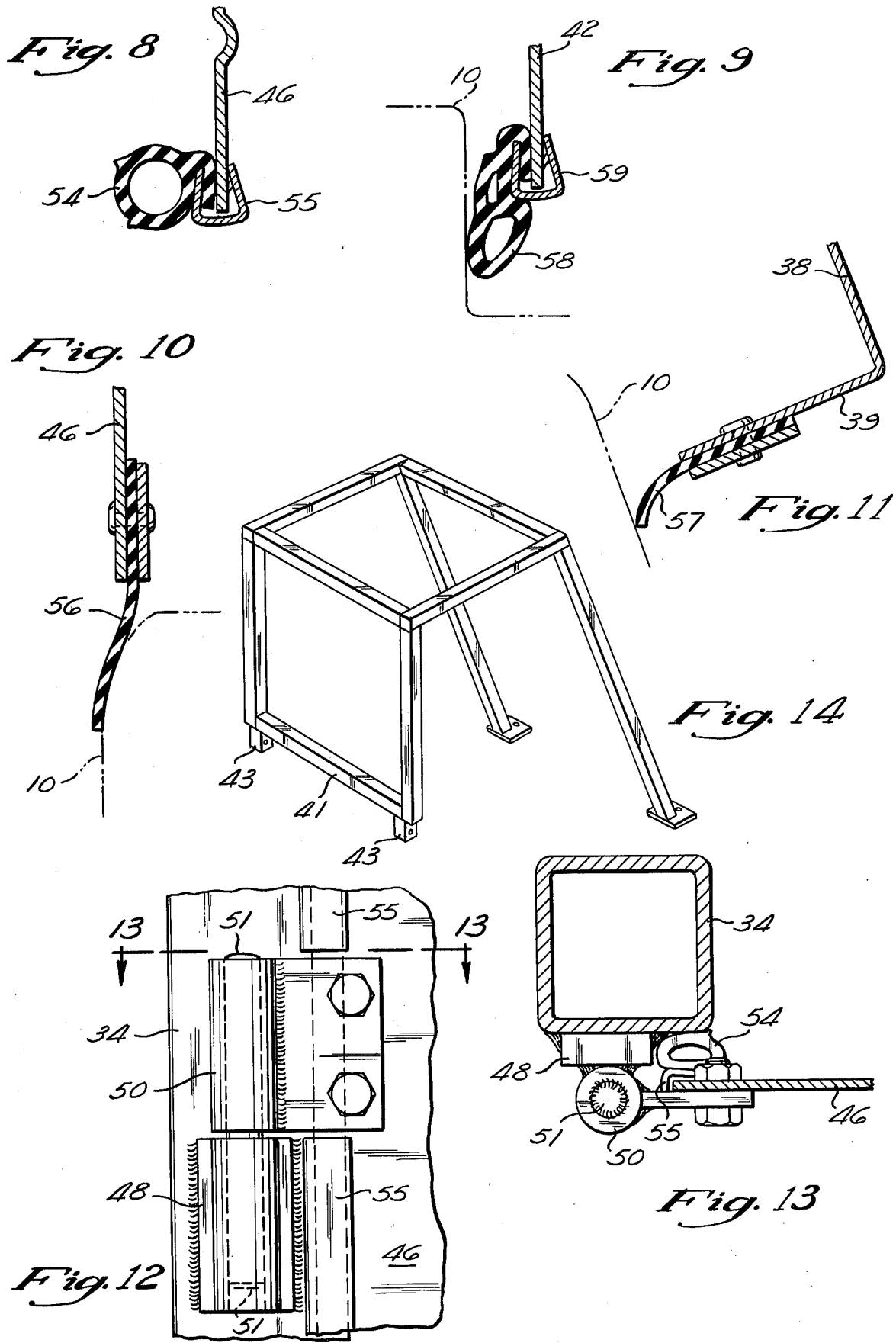

CAB FOR INDUSTRIAL TRUCK

Cabs for industrial lift trucks are widely used for operations in unheated or dusty spaces. Generally these cabs are provided with removable doors so that the cabs may be open for greater comfort and convenience in summer operations where dust protection is not required. Head clearance when entering and leaving the cab must be adequate but a cab cannot exceed in height the boom of the lift truck without limiting the overall vertical clearance of the vehicle. It is therefore desirable that the tops of the doorways or side openings in the cab closely approach the level of the topmost portion of the cab roof structure. On the other hand it is necessary for safety purposes to provide for overhead protection and it is usually necessary also to provide for a window opening in the cab roof for both overhead visibility and summer ventilation.

Prior art cabs have sought to provide overhead protection by use of a deep-sectioned roof or by use of protective racks mounted in spaced relation above a windowed cab roof, thus reducing either headroom or overall vertical clearance of the vehicle, or a combination of both, by an amount equivalent to the deepened section of the roof or to the spacing of the protective rack above the roof.

Cabs for industrial trucks have generally included front, rear and side walls, doors for the cab being hinged to the side walls to be opened or removed for summer operation. Side clearance for entrance and egress to and from the cabs has generally been limited to a door opening, the width of which is considerably less than the front-to-rear dimension of the cab.

The roof structure of the cab of the present invention comprises a frame of tubular steel members closed by a web of steel plating with novel window means opening through the steel plating. The frame and the roof of steel plating provide great overhead protection. Head clearance extends to the roof frame itself.

The cab frame of the invention includes four upright corner members which support the roof frame members. The cab doors of the invention sealingly engage the associated top and corner frame members, so that when the doors are opened or removed, side clearance comprises substantially the entire front-to-rear extent of the cab.

The front and rear faces of the cab are closed by windowed wall means provided with resilient sealing means for engaging the truck body. The bottoms of the doors are provided with similar means. The four upright corner members of the frame are bolted directly or indirectly to the roll bar brackets of the lift truck. When they are so bolted and the doors are closed a substantially weatherproof cab enclosure with strong overhead protection is provided.

The features and advantages of the invention are illustrated in the embodiment described below.

IN THE DRAWINGS

FIG. 1 is a drawing of an industrial lift truck employing a combined overhead protector and cab embodying the invention.

FIG. 2 is a side elevation of the cab seen in FIG. 1, with part of the truck body being shown in phantom.

FIG. 3 is a rear elevation of the same cab.

FIG. 4 is a front elevation of the cab.

FIG. 5 is a plan view of the cab roof, with the window cover partly broken away.

FIG. 6 is a section taken on the plane of line 6—6 in FIG. 5.

FIG. 7 is an exploded perspective view showing the frame elements and some of the face elements of the cab.

FIGS. 8, 9, 10 and 11 are enlarged cross-sectional detail views taken on the planes of lines 8—8, 9—9, 10—10 and 11—11 in FIGS. 2, 3, 2 and 4 respectively. In FIG. 8 the cooperating surface for the illustrated resilient sealing means is omitted and the sealing means is shown in uncompressed condition. The sealing means in FIGS. 9, 10 and 11 are shown in compressed condition in association with their cooperating surfaces, indicated in phantom.

FIG. 12 is an enlarged view of a portion of FIG. 2 illustrating door hinge details.

FIG. 13 is a cross-section taken on the plane of line 13—13 in FIG. 12.

FIG. 14 is a view similar to FIG. 7 but without face elements, showing a modified frame structure.

An industrial lift truck 10 (shown in FIG. 1 without its associated forklift and boom) is provided with a combined overhead guard and weatherproof cab 12. At locations 14, only one of which can be seen in FIG. 1, the truck 10 is provided with mounting brackets for a front roll bar. At locations 16, the truck is provided with mounting brackets for a rear roll bar.

The cab comprises a frame of steel tubing best seen in FIG. 7. The steel tubing is preferably of rectangular cross-section. The frame comprises four generally horizontal roof members 21–24 defining a horizontal rectangular roof face, and four generally upright corner members 31–34 defining front, side and rear faces. The generally upright corner members are provided with mounting means such as the feet 35 (FIGS. 2, 7) or female connections (open ends) 37 for reception on and bolting to mounting brackets at the locations 14 and 16 on the truck body. The mounting brackets may have the form of pads at locations 14 and upstanding male studs at locations 16. Where the lateral spacing between the mounting brackets is different at the front and rear of the seat portion of the truck body, at least some of the generally upright frame members may be indirectly affixed. For example the rear generally upright frame members may be affixed via an extra cross member 41 (FIG. 14) and offset mounting means such as the female connections 43.

The roof face is covered by quarter-inch steel plating 36 (FIGS. 2, 5). The front face is covered and closed partly by steel sheeting 38 (FIGS. 4, 7) and partly by a glass window 40 (FIG. 4). The rear face is covered partly by steel sheeting 42 (FIGS. 3, 7) and partly by a window 44 (FIG. 3). The upper portion of the rear face covering may be hinged on horizontal hinging (not shown) to open rearwardly for additional ventilation in hot weather, or the entire covering may be permanently closed, as shown.

A windowed side door 46 (FIG. 2) is provided at each side of the cab 12. Each side door is hinged to one of the generally upright corner frame members 33 or 34. Each hinge may have a hinge element 48 (FIG. 12) directly welded to the frame members 33 or 34 and an associated hinge element 50 fixed to the door. A hinge pin 51 is fixed to the hinge element 50 and has a slip fit with the hinge element 48. The doors may therefore be removed by lifting upwards until the hinge pin clears the barrel of the stationary element 48. Once removed, they may be readily reinstalled by reversing the procedure. Door sealing means extend around the inner sides of each door adjacent the edges of the door and are positioned to engage the corner and roof frame members 31, 24 and 34 or 32, 22 and 33 associated with each door. These means include a rubber bulb seal 54 (FIGS. 8, 13) held in place by a steel grip channel 55 (FIGS. 2, 8, 12, 13). The rubber bulb seal 54 may be provided with vent holes (not shown). The very bottom of each door may be provided with a rubber weather seal 56 (FIGS. 2, 10) secured by a steel retainer strip and rivets and coactive with the truck body 10 as illustrated in FIG. 10.

The bottom edge of the steel sheeting 38 at the front face of the cab is provided with a re-entrant flange 39 (FIG. 11) that extends backwardly between the two front corner frame members 31 and 32 and is provided at the lower edge with a rubber weather seal 57 that cooperates with the truck body 10 and is held in place by a steel retainer strip and rivet in the manner illustrated in FIG. 11. The lower edge of the steel sheeting 42 at the rear of the cab is provided with a rubber wedge bulb 58 (FIG. 9) which seals against the truck body 10 and is held in place by a steel grip channel 59.

The steel plating 36 of the cab roof is provided with a plurality of openings 61 punched or otherwise cut through the steel plating over a portion thereof as best illustrated in FIG. 5. These openings form the lights of a roof window, such lights being spaced from each other by uncut portions of the steel plating which form bars 62 which are integral with the uncut steel plating 36 at each side of the window. A window frame 64 (FIGS. 5, 6) is supported on and upstanding from the steel plating 36 and surrounds the portion of the steel plating 36 where the window is formed by the window lights 61. A removable or otherwise openable window cover 66 includes glazing 68 and may be held in place simply by bolts 70 received in tapped holes 71 formed in the window frame 64.

The bars 62 which run transversely of the window may be reinforced by channel means such as the angle irons 73 which are welded to their associated bars 62 along their contacting edges.

The described cab 12 is quickly mounted on the roll bar brackets and provides an overhead guard that meets high current safety specifications. The cab also provides a weatherproof closure when the doors are mounted and closed. When the doors are opened or removed, headroom and sideroom is excellent for entry or egress to the cab and for fullest visibility to the sides of the cab, vertical clearance being limited only by the roof frame members 22 and 24 and side clearance being limited only by the generally upright corner frame members, 31 and 34 on one side of the cab and 32 and 33 on the other. The overhead window comprised of lights 61 and openable window cover 66 interferes minimally with the structural integrity of the rugged structure comprising the roof frame members 21–24 and the quarter-inch steel plating 36.

The invention is not restricted to the slavish imitation of each and every one of the details described above, which have been set forth merely by way of example with the intent of most clearly setting forth the teaching of the invention. Obviously, devices may be provided which change, eliminate, or add certain specific details without departing from the invention.

What is claimed is:

1. In combination, an industrial lift truck equipped to accept optional front and rear roll bars at mounting brackets on the truck and a quick-mounting combined overhead guard and weatherproof cab removably mounted on the body of the lift truck including a frame of elongated steel structural elements comprising four generally horizontal roof members defining a horizontal rectangular roof face and four generally upright corner members defining front, side and rear faces, steel plating covering the roof face, the corner members of each side face lying in a generally vertical plane extending from the front to the rear of the cab, cab closure means including window means covering the front and rear faces and having lower edges terminating above the bottoms of the associated corner members, face-to-body sealing means at the lower edges of the cab closure means at the rear and front faces in direct sealing engagement with adjacent rear and front areas of the truck body, rigid side doors each hingeable on a corner frame member associated with one of the side faces for closing the face, resilient door sealing means extending around the inner sides of the door adjacent the edges thereof and positioned to engage the corner and roof frame members associated with the door, the truck body including generally vertical surfaces at its sides extending below the seal engaged front and rear truck body areas and surrounding zones of access and egress defined by said doors, the doors having lower edges generally below the level of the lower edges of the front and rear cab closure faces, and resilient face-to-body sealing means on the lower edge of each door arranged to directly engage against said generally vertical surface areas of the adjacent side of the truck body, said resilient door sealing means and resilient face-to-body sealing means being in a compressed condition with respect to the adjacent cab and body surfaces engaged thereby when their respective door is closed, the side faces with the exception of their respective doors being substantially free of cab structure in the area of the lower door edges whereby the adjacent side areas of the truck body are substantially unobstructed by the cab when the doors and associated face-to-body sealing means are displaced when opened or removed from their respective faces.

2. In a cab embodying an overhead guard, a fenestrated protective roof comprising steel plating supported by the framing of the cab, a plurality of openings in regular array cut through the steel plating over a portion of the steel plating and forming the lights of a roof window, said lights being spaced from each other by uncut portions of the steel plating which form bars integral with the uncut steel plating at each side of the window, a window frame supported on and upstanding from the steel plating and surrounding said portion of the steel plating, and an openable window cover surrounding and covering said window frame, at least the majority of the area of the window cover being transparent.

3. In a cab embodying an overhead guard, a fenestrated protective roof comprising steel plating supported by the framing of the cab, a plurality of openings in regular array cut through the steel plating over a portion of the steel plating and forming the lights of a roof window, said lights being spaced from each other by uncut portions of the steel plating which form bars integral with the uncut steel plating at each side of the window, a window frame supported on and upstanding from the steel plating and surrounding said portion of the steel plating, a window cover on said frame, and channel means welded to the top sides of at least some of said bars in non-interfering relationship with said window lights and extending from side to side of said window below said window cover.

* * * * *